UNITED STATES PATENT OFFICE.

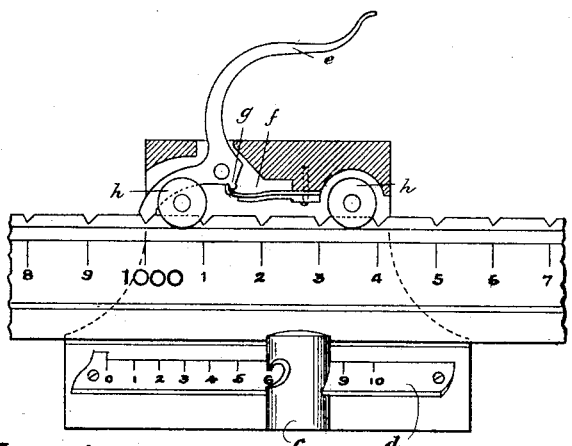
Fig. 1,
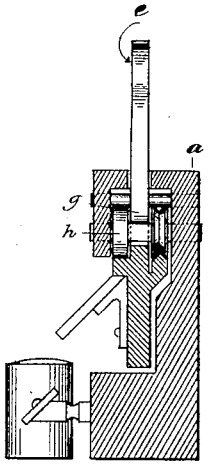
Fig. 3,
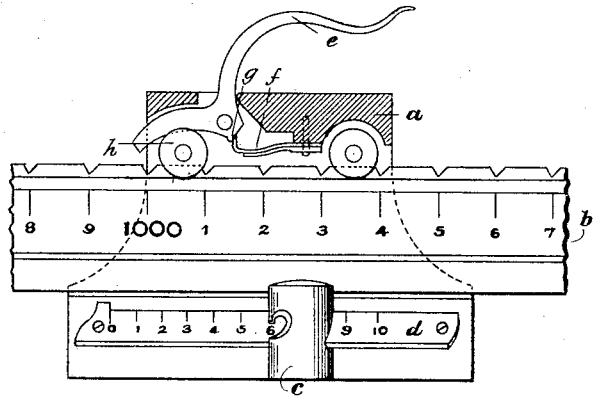
Fig. 2,
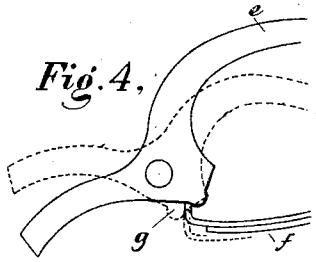
Fig. 4,
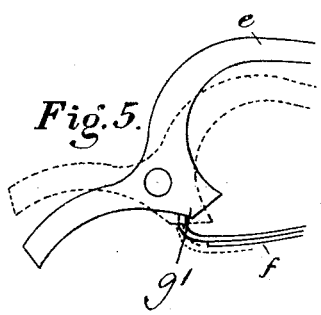
Fig. 5.

WILLIS H. SARGENT, OF ST. JOHNSBURY, VERMONT, ASSIGNOR TO THE E. AND T. FAIRBANKS AND COMPANY, OF ST. JOHNSBURY, VERMONT, A CORPORATION OF VERMONT.

WEIGHING-SCALE.

No. 859,695.  Specification of Letters Patent.  Patented July 9, 1907.

Application filed July 12, 1906. Serial No. 325,861.

*To all whom it may concern:*

Be it known that I, WILLIS H. SARGENT, a citizen of the United States, residing at St. Johnsbury, in the county of Caledonia, State of Vermont, have invented certain new and useful Improvements in Weighing-Scales, of which the following is a description, reference being had to the accompanying drawing, and to the letters and figures of reference marked thereon.

This invention relates to weighing scales of that class in which a manually shiftable poise is moved along the scale beam to ascertain the correct weight of the load.

In weighing where great accuracy is required, it is not considered sufficient to set the poise opposite the graduation on the beam by the eye, but rather to notch the top of the beam and provide the poise with a pawl or dog which should engage in these notches and hold the poise in its proper position. Such poises are provided with rollers which run on the top of the beam, and also with a spring to hold this dog in position.

In operation this dog is lifted out of the notch by pressing on the handle and the poise is run along by estimation until the weight is nearly reached. This dog is then dropped into one notch after another until by trial nearly the right weight is obtained, and the final results are secured by moving the small poise which indicates the finer graduations. This method is necessarily slow because in finding the approximate weight, the dog must drop into the several notches and the hand of the operator must be removed each time so as to allow the beam to rise when the proper position is reached.

The principal object of the invention is to provide a device of this type in which the poise is arranged for free movement along the beam, and to so arrange the poise that it may be accurately held at any desired point.

A further object of the invention is to provide means by which the dog may be kept lifted out of engagement with the notches on the beam, so that the poise may be moved along by merely touching it with the fingers until nearly the right position is reached. At this point the poise is moved back until the dog engages the nearest notch, and the final results are obtained by the small poise.

With these and other objects, the invention consists in the various matters, all as hereinafter described and referred to in the appended claims.

Figure 1 is a sectional elevation of a poise constructed in accordance with the invention showing the same in position on a scale beam; Fig. 2 is a similar view, the dog being raised to permit free movement of the poise; Fig. 3 is a transverse sectional view through the poise and beam; Fig. 4 is an enlarged detail view of the dog and its holding spring, and Fig. 5 illustrates a slight modification of the invention.

Similar numerals are used to indicate corresponding parts throughout the specification and claims.

The device as illustrated in the accompanying drawing, shows, for convenience, a duplex poise $a$ carrying a small beam $d$ and its poise $c$ for fractional or smaller weights. The poise $a$ is mounted on rollers $h$ to permit free movement from end to end of the scale beam and said poise carries a pivoted dog or pawl $e$ which may engage with the notches usually formed at the top of the beam in alinement with the graduations. The pawl or dog is provided with an operating handle which also serves as a finger hold in moving the poise and this pawl is engaged by a spring $f$ which acts to hold the pawl in operative or inoperative position as required, the free end of the spring being arranged to engage and hold the pawl at one or other side of its pivotal point as shown in Figs. 1, 2, 4 and 5.

It is preferred, for ordinary purposes, to provide the pawl with a small lug or heel piece $g$, so that the action of the spring may be made more positive, but this is not essential, as will be understood on reference to Fig. 5, where the spring engaging shoulders $g'$ are shown angularly related.

In use, the handle portion of the pawl may be lightly depressed, so that the poise may be adjusted and quickly released to engage with any one of the beam notches, or the handle may be fully depressed to lock the pawl in inoperative position, so that the poise may be run quickly from end to end of the beam.

Having thus described my invention, what I claim as new and desire to secure by Letters Patent, is:—

1. The combination in a weighing scale, of a notched beam, a poise movable thereon, a pivotally mounted handled pawl carried by the poise, and means for locking the pawl in inoperative position to permit free adjustment of the position of the poise.

2. A poise, a pivoted pawl carried thereby, and a spring for holding the pawl in operative and inoperative positions.

3. A poise, a pawl pivoted thereto and having an upwardly projecting handle, said pawl provided with a projecting lug, and a spring arranged to engage with the lug to hold said pawl in either operative or inoperative positions.

In testimony whereof I affix my signature, in presence of two witnesses.

WILLIS H. SARGENT.

Witnesses:
 FRANK O. FRENCH,
 J. M. PERHAM.